April 8, 1969     T. C. JEDNACZ     3,437,904
RECTIFIER SYSTEM WITH ZERO CROSSING CONTROL CIRCUITS
FOR SEMICONDUCTOR SWITCHES
Filed May 22, 1967
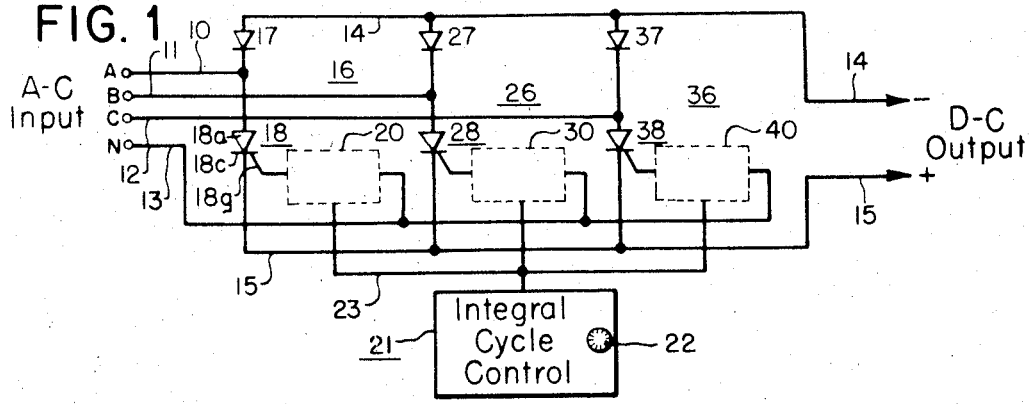
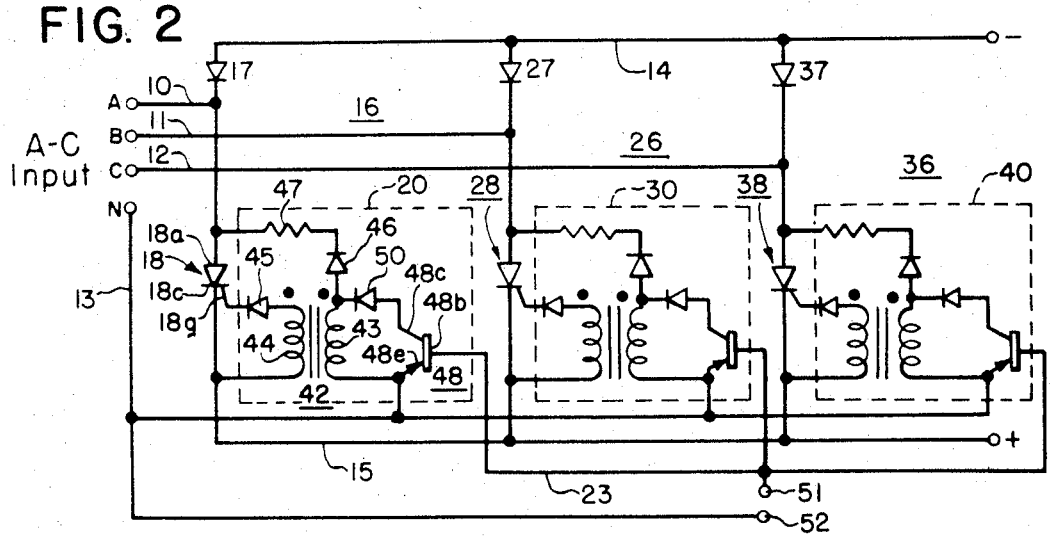
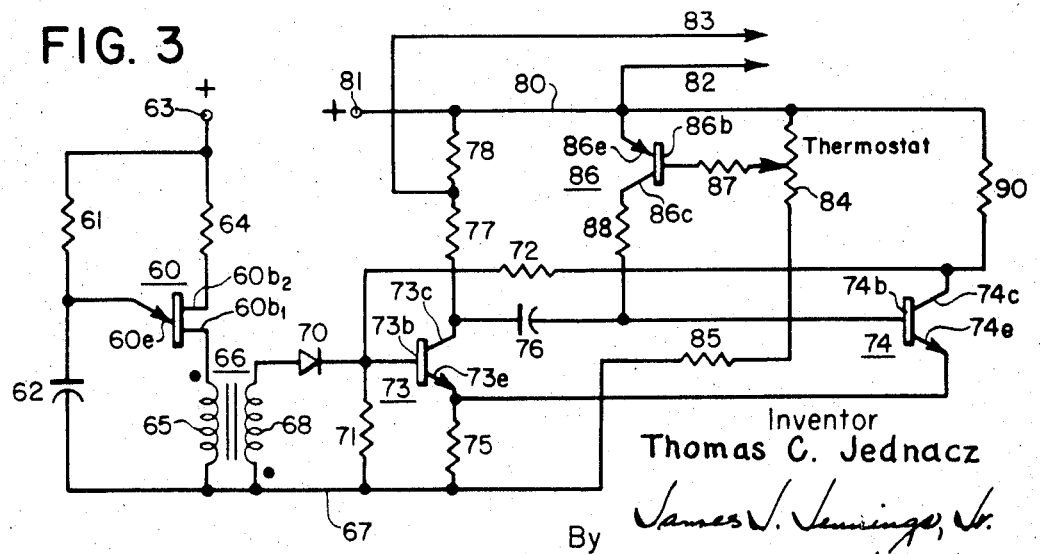
Inventor
Thomas C. Jednacz
By James V. Jennings, Jr.
Attorney United States Patent Office 3,437,904
Patented Apr. 8, 1969

3,437,904
RECTIFIER SYSTEM WITH ZERO CROSSING CONTROL CIRCUITS FOR SEMICONDUCTOR SWITCHES
Thomas C. Jednacz, York, Pa., assignor to Borg-Warner Corporation, Chicago, Ill., a corporation of Illinois
Filed May 22, 1967, Ser. No. 640,026
Int. Cl. H02m 7/52
U.S. Cl. 321—5                    5 Claims

ABSTRACT OF THE DISCLOSURE

A three phase rectifier arrangement includes, in each phase, a diode with an SCR which has its gate coupled over a transformer to the A-C input circuit. When the varying A-C input is of the wrong polarity to make the SCR conduct, it is of the proper polarity to cause current flow across the transformer to the SCR gate. As soon as the input A-C polarity across the SCR changes, the SCR immediately conducts because current is already flowing in the gate circuit. A transistor is coupled in parallel with the transformer primary winding and, when gated on, effectively shunts the primary and prevents current injection into the SCR gate, thus preventing conduction of the SCR during a particular cycle or cycles. A pulse generator which includes a thermostat applies cycle control signals to all the transistor switches.

BACKGROUND OF THE INVENTION

The present invention is illustrated in connection with a rectifier system for converting A-C energy into D-C energy. Conduction of the electronic switching components is regulated over a complete cycle, or an integral number of cycles, of the A-C input signal. The present invention includes an improved pulse generator circuit for generating the control signal which, when applied to the rectifier portion of the system, maintains the rectifier arrangement non-conductive over one or more complete cycles of the A-C input signal.

Many inverter systems have been fabricated with phase angle control in which the load requirements or the level of the D-C output signal is sensed, or some other approach is utilized to provide a control signal regulating that portion of the input A-C cycle over which the system will be effective to produce D-C output energy. Disadvantages of such systems include the complex and expensive logic circuitry necessarily entailed in a phase angle control arrangement and the production of undesirable radio-frequency interference (RFI) as the SCR's are rapidly switched during only a fraction of an input cycle time. Moreover the efficiency generally drops off at partial load with a phase angle control system and the ripple factor becomes higher, necessitating the use of a D-C choke which occupies considerable valuable space and is also costly. These manifest disadvantages of the complex phase angle control system have encouraged considerable research activity to find another and better solution of the power conversion arrangement, but only the rectifier arrangement illustrated in connection with the pulse width control circuit of this invention has overcome these disadvantages.

SUMMARY OF THE INVENTION

The present invention is useful with a rectifier system in which each phase circuit includes a unidirectional current conduction means coupled in series with a first semiconductor switch, with an auxiliary current conduction circuit connected to regulate conduction and non-conduction of the first semiconductor switch. The present invention includes a control circuit which is coupled to the auxiliary current conduction circuit to regulate conduction and non-conduction of the first semiconductor switch. The control circuit comprises means for generating a train of spaced apart timing pulses, each of which represents the leading edge of a control pulse. A second semiconductor switch is connected to be switched from a first state to a second state upon receipt of one of the timing pulses. A third semiconductor switch is coupled through a capacitor to the second switch, such that the third semiconductor switch is switched from the second state to the first state responsive to switching of the second switch from the first to the second state. A variable impedance is coupled in the circuit which includes the capacitor, to determine the time duration of the control pulse. The trailing edge of this control pulse occurs as the second semiconductor switch is returned to the first state and the third switch is returned to the second state. Means including a semiconductor component is coupled to the variable impedance and to the capacitor, for effectively multiplying the value of the variable impedance and correspondingly broadening the dynamic operating range of the control pulse system.

THE DRAWINGS

In the several figures of the drawing like reference numerals identify like elements and in the drawing:

FIGURE 1 is a block and schematic diagram illustrating the general arrangement of the rectifier system in its relation to the control circuit of this invention;

FIGURE 2 is a schematic diagram depicting circuit details of the rectifier arrangement; and FIGURE 3 is a schematic diagram disclosing circuit details of a preferred embodiment of this invention.

General system description

FIGURE 1 depicts the rectifier arrangement for receiving A-C input energy over conductors 10–13 (frequently designated A, B, C and N) and transferring D-C output energy over conductors 14, 15. Phase circuit 16 includes a unidirectional current conduction means or diode 17 coupled between input conductor 10 and output conductor 14, and a first semiconductor switch 18 having anode and cathode elements 18a and 18c coupled between input conductor 10 and output conductor 15 in a sense to pass current in the same direction, with respect to the output conductors 14 and 15, as does diode 17. Semiconductor switch or SCR 18 also includes a gate or control element 18g.

An auxiliary current conduction circuit 20 is provided to pass current to the control element 18g when a potential difference of one polarity is applied between input conductors 10, 13, which polarity is not the appropriate one to effect current flow through SCR 18. Accordingly as soon as the polarity of the voltage between conductors 10 and 13 reverses, because the current flow to gate 18g does not cease instantaneously, SCR 18 is triggered on and conducts current from input conductor 10 through the SCR, over output conductor 15 and the load (not shown) connected to the output conductors, output conductor 14 and one of the diodes 27, 37 and its associated input conductor 11 or 12 to the A-C input circuit. Thus absent any regulation by integral cycle control unit 21, shown coupled to each of the auxiliary current conduction circuits 20, 30 and 40, each of the semiconductor switches 18, 28 and 38 will be gated on when current is injected into its gate and then the appropriate polarity potential difference is applied between its anode and cathode, and a D-C output voltage will be passed over output conductors 14, 15 to any suitable load. Adjustment of regulating means or knob 22 in unit 21 will, in a manner to be described hereinafter in connection with FIGURE 2, in effect interrupt the gate circuits of the SCR's and thus prevent their conduction during one complete cycle, or a plurality of cycles, of the alternation of the A-C input signals.

*Detailed system description*

Considering now the more detailed showing of FIGURE 2, when the system is energized a three phase A-C potential is applied between conductors 10, 11, 12 and 13 of the rectifier system. Assuming initially that switching means 48 in circuit 20 is non-conductive and that the potential on first input conductor 10 is negative with respect to that on second input conductor 13, current flows from conductor 13 over primary winding 43, diode 46, and resistor 47 to first input conductor 10. The windings of transformer 42, as indicated by the polarity dots, provide a potential difference across secondary winding 44 which causes current to flow through diode 45 into gate 18g of semiconductor switch 18. However with the potential on its anode negative with respect to its cathode at this time, the semiconductor switch is not rendered conductive.

As soon as the polarity of the potential applied between conductors 10, 13 reverses, the appropriate energizing polarity is provided across anode 18a and cathode 18c of SCR 18, and current is still being injected into its gate 18g by reason of the inductance in the transformer circuit. Accordingly SCR 18 is "fired" precisely at the time when the applied A-C voltage crosses the zero axis and goes positive. The SCR is commutated or turned off when the applied voltage goes negative. Inspection of the second and third phase circuits 26, 36 shows exactly similar operation occurs in those circuits.

It is noted that, once SCR 18 has been prepared for operation by injection of gate current over transformer 42 and diode 45, and then fired as a voltage of the proper polarity appears between conductors 10 and 13, SCR 18 cannot be turned off during the remainder of that cycle as its anode remains positive relative to its cathode. When it is desired to prevent conduction of SCR 18 during the input A-C cycle when its anode is positive with respect to its cathode, a suitable signal is provided by integral cycle control circuit 21 and applied to terminals 51, 52. This signal passes over conductor 23 to render switching means 48 closed or conductive. As transistor 48 conducts, it effectively short circuits primary winding 43 and thus there is no significant current flow across transformer 42 to inject current into the gate 18g of SCR 18. With no gate current flowing during the half cycle when anode 18a is negative with respect to cathode 18c, after the polarity reverses semiconductor switch 18 will not be gated on because there is no turn-on signal at its gate. It is noted that even if transistor 48 becomes non-conductive during this latter portion of the input cycle (when anode 18a is positive relative to cathode 18c), the SCR 18 will still not be switched on because the applied potential difference is not of the proper polarity to effect current flow from the input circuit 10, 13 across transformer 42 to gate 18g. Thus a true integral cycle switching arrangement is provided for the rectifier system because the SCR's cannot be turned on or off at the wrong time. That is, the semiconductor switches can never conduct over a fractional portion of the A-C input cycle but they either conduct over an entire cycle by reason of the current injection already provided during the negative half cycle or else remain nonconductive throughout the cycle if there is no current passed to the gate to condition the SCR for conduction. Exactly similar operation of the auxiliary current conduction circuits 30, 40 in the other phase circuits 26, 36 occurs as the system is energized.

*Control circuit*

FIGURE 3 illustrates a preferred embodiment of the control circuit for generating switching signals or control pulses for regulating conduction of the transistors (such as 48) in each of the auxiliary current conducting circuits. In the left-hand portion of FIGURE 3 unijunction transistor 60 includes an emitter 60e, a first base connection $60b_1$ and second base connection $60b_2$. Emitter 60e is connected to the common connection between a resistor 61 and a capacitor 62. The other end of resistor 61 is coupled to a first positive input terminal 63, and this terminal is also coupled through another resistor 64 to base $60b_2$. The other base $60b_1$ is coupled through primary winding 65 of transformer 66 to reference conductor 67.

Transformer 66 has a secondary winding 68, one end of which is coupled to conductor 67 and the other end of which is coupled over a diode 70 to the common connection between resistor 71, resistor 72, and base 73b of transistor 73. The other side of resistor 71 is connected to conductor 67. Emitter 73e is coupled to emitter 74e of another transistor 74, and both emitters are coupled through resistor 75 to conductor 67.

Collector 73c is coupled through a capacitor 76 to base 74b, and collector 73c is also coupled through the series circuit including resistors 77, 78 to conductor 80, itself connected to another positive energizing terminal 81. The output conductors 82, 83 are coupled to conductor 80 and to the junction between resistors 77 and 78.

A variable impedance 84, shown as a potentiometer, is coupled between conductor 80 and a resistor 85, the other side of which is connected to conductor 67. Although shown as a potentiometer element 84 may in fact be a thermostat or other variable impedance element which exhibits a change in its effective resistance as a function of ambient temperature. In accordance with the inventive teaching, a semiconductor component shown as a transistor 86 has its base 86b coupled through a resistor 87 to the movable tap of thermostat 84, and its collector 86c is coupled through another resistor 88 to the common connection between capacitor 76 and base 74b of transistor 74. A resistor 90 is coupled between conductor 80 and the common connection between resistor 72 and collector 74c.

Basically the circuit of FIGURE 3 is a pluse width modulated one shot multivibrator. The unijunction timing circuit including transistor 60 may be considered as means for generating a train of spaced apart timing pulses, each of which represents the leading edge of a control pulse. As is well known in this art the timing pulse produced by this circuit is a positive-going "spike" or sharply defined trigger pulse which is coupled over transformer 66 and diode 70 to base 73b. (Note: transistors 73 and 74 respond to the description of second and third semiconductor switches in claim 1.) Transistor 73 was in a first state ("off") and upon receipt of one timing pulse is switched to a second state ("on"). As transistor 73 rapidly becomes conductive, a negative-going output pulse is provided at collector 73c. The output pulse is developed across resistor 78 and applied over output conductor 83. Conductors 82, 83 would normally be connected to terminals 52, 51 in FIGURE 2 so that the negative-going pulse on conductor 83 would be simultaneously applied to the base of the switching means in each of the auxiliary current conducting circuits 20, 30 and 40. In a preferred embodiment the "width" or time duration of the control pulse appearing on conductor 83 was made to vary from approximately 0.25 seconds to 2.5 seconds. The high scale value of 2.5 seconds provides a constant negative voltage because the pulse width is then equal to the repetition rate for the circuit values given as an illustration at the end of the specification.

Transistor 74 is normally in the second state ("on") because it is saturated by reason of the potential applied from conductor 80 through transistor 86 and resistor 88 to base 74b, so that the potential at collector 74c is approximately one volt. When the positive-going trigger pulse is applied to base 73b, transistor 73 is rapidly driven into saturation and the voltage at collector 73c goes negative, toward ground potential, coupling a negative-going pulse through capacitor 76 to base 74b and driving transistor 74 into the first state ("off"). Accordingly the voltage at collector 74c rapidly goes positive and this voltage is applied back through resistor 72 and to base 73b, holding transistor 73 in the saturated condition until capacitor 76 charges sufficiently so that the potential at base 74b is sufficiently positive to again drive transistor 74 into saturation, that is, back into the second state ("on"). As transistor 74 conducts collector 74c rapidly goes negative and this negative-going pulse is applied over resistor 72 to base 73b to cut off transistor 73 (and return the circuit to its initial or normal state). This operation determines the occurrence of the trailing edge of the control pulse and thus its time duration. Thereafter current flow through transistor 74 and resistor 75 develop a voltage drop across resistor 75 of the proper polarity to keep transistor 73 turned off.

The time duration or width of the negative output pulse between conductors 83, 82 is determined by transistor 86. In accordance with the present invention this transistor is used as a variable resistance, with its collector circuit impedance varying as a function of the bias voltage applied to base 86b which in turn is determined by the setting of potentiometer or thermostat 84. With a standard 135 ohm thermostat, as the effective value of thermostat 84 is varied from zero to 135 ohms the conduction level of transistor 86 is driven from cut off to saturation. At cut off the effective resistance of transistor 86 is very high, several hundred thousand ohms. At saturation the effective resistance of this transistor is approximately 750 ohms, and this value determines the minimum pulse width produced by the system.

To assist those skilled in the art to make and use the invention, a table of circuit values utilized in a preferred embodiment is set out below. It is emphasized that this table of values is given by way of illustration only and in no sense as a limitation on the invention.

| Component: | Identification or value |
|---|---|
| 18, 28, 38, 17, 27, 37 | GEC3513BF1AD1 |
| 48, 86 | 2N404A |
| 60 | 2N1671 |
| 73, 74 | 2N2925 |
| 45, 46, 50, 70 | 1N540 |
| 62 | microfarads 10.0 |
| 76 | do 10 |
| 47 | ohms 1K |
| 61 | do 247K |
| 64 | do 1K |
| 71 | do 47K |
| 72 | do 6.8K |
| 75 | do 50 |
| 77 | do 150 |
| 78 | do 1K |
| 84 | do 0-135 |
| 85 | do 2K |
| 87 | do 5.1K |
| 88 | do 750 |
| 90 | do 1K |
| Terminal: | |
| 63 | volts +7.5 |
| 81 | do +10.0 |

The present invention provides simple and positive regulation of a three phase rectifier circuit. The control pulse generating circuit includes a variable impedance, which may be a thermostat, for regulating the time duration of the control pulse. Of particular importance is the semiconductor component, such as a transistor, which effectively multiplies the value of the variable impedance and correspondingly broadens the dynamic operating range of the control pulse system.

While only a particular embodiment of the invention has been shown and described, it will be apparent to those skilled in the art that various changes and modifications may be made therein without departing from the invention in its broader aspects.

What is claimed is:

1. For use with a rectifier system in which each phase circuit includes a unidirectional current conduction means and a first semiconductor switch coupled in series, with an auxiliary current conduction circuit connected to regulate conduction and non-conduction of the first semiconductor switch, the improvement which comprises
   a control circuit, coupled to the auxiliary current conduction circuit to regulate conduction and non-conduction of the first semiconductor switch, comprising means for generating a train of spaced apart timing pulses each of which represents the leading edge of a control pulse, a second semiconductor switch connected to be switched from a first state to a second state upon receipt of one of said timing pulses, a third semiconductor switch, a capacitor coupled between the second and third semiconductor switches such that the third semiconductor switch is switched from the second state to the first state responsive to switching of the second switch from the first to the second state, a variable impedance coupled in a circuit including said capacitor to determine the time duration of said control pulse, the trailing edge of which pulse occurs as the second switch is returned to said first state and the third switch is returned to said second state, and means including a semiconductor component coupled to said variable impedance and to said capacitor, for effectively multiplying the value of the variable impedance and correspondingly broadening the dynamic operating range of the control pulse system.

2. A control circuit as claimed in claim 1 in which the means for generating the train of spaced apart timing pulses includes a unijunction transistor having a pair of base elements and an emitter element, means for applying a potential difference across said base elements and across a charging circuit including a capacitor and a resistor, and means for coupling said emitter element to the junction between said capacitor and resistor such that the charging rate of this circuit determines the frequency of conduction of the unijunction transistor.

3. A control circuit as claimed in claim 1, in which said second and third semiconductor switches are transistors, and in which said variable impedance is a thermostat.

4. A control circuit as claimed in claim 3 in which said semiconductor component is a transistor having an emitter coupled to an energizing conductor, a base coupled through a first resistor to said thermostat, and a collector coupled through a second resistor to the junction between the base of the transistor which is the third semiconductor switch and the capacitor which is coupled to the collector of the transistor which is the second semiconductor switch.

5. For use with a three phase rectifier system in which each phase circuit includes a diode coupled in series with a silicon-controlled rectifier, with an auxiliary current conduction circuit including a transformer and a switching transistor connected to regulate conduction and non-conduction of the silicon-controlled rectifier, the improvement which comprises
   a control circuit, coupled to the auxiliary current conduction circuit, comprising an oscillator circuit including a unijunction transistor for generating a train of spaced apart timing pulses each of which represents the leading edge of a control pulse, a second transistor connected to be normally non-conductive and to be switched from off to on upon receipt of one of said timing pulses, a third transistor, a capacitor coupled between the second and third transistors such that the third transistor is switched from on to off when the second transistor is switched from off to on, a thermostat connected to provide an impedance which varies as a function of temperature and a fourth transistor connected between said thermostat and said capacitor to effectively amplify the value of the thermostat, such that the thermostat, fourth transistor and capacitor regulate the time duration of the control pulse, the trailing edge of which pulse occurs as the third transistor is again switched on and the second transistor correspondingly switched off.

References Cited

UNITED STATES PATENTS

| | | | |
|---|---|---|---|
| 3,281,645 | 10/1966 | Spink | 321—47 |
| 3,335,291 | 8/1967 | Gutzwiller | 323—22 |
| 3,381,226 | 4/1968 | Jones et al. | 307—252 |

W. H. BEHA, JR., *Assistant Examiner.*

LEE T. HIX, *Primary Examiner.*

U.S. Cl. X.R.

307—252; 321—47